Aug. 11, 1970    J. M. CORTES    3,523,879
METHOD AND APPARATUS FOR MATERIAL EXTRACTION
Filed Aug. 25, 1966
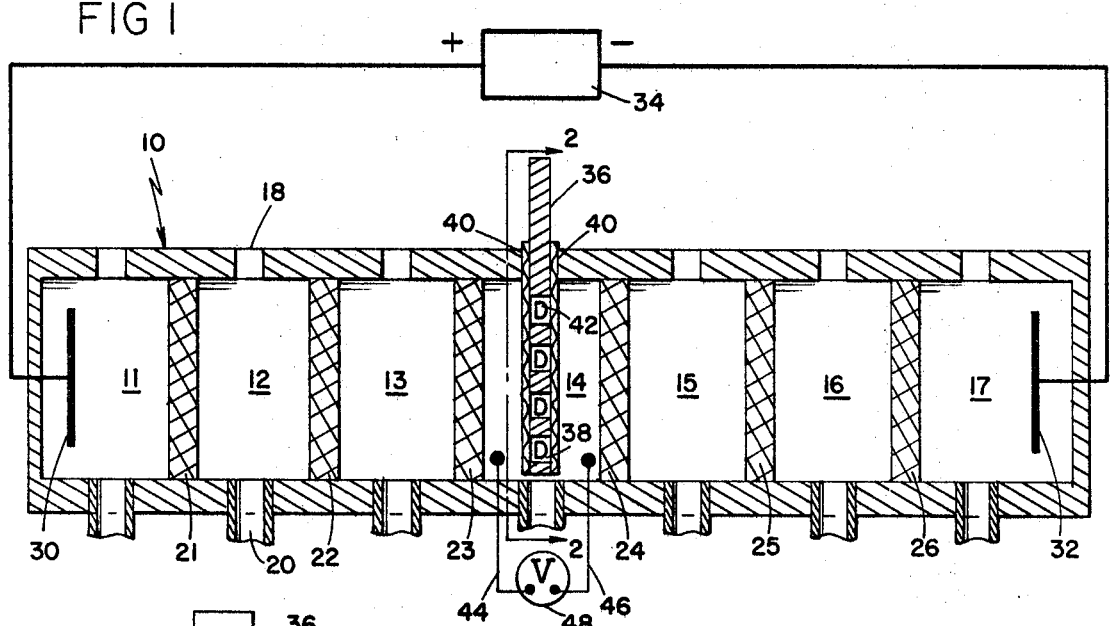
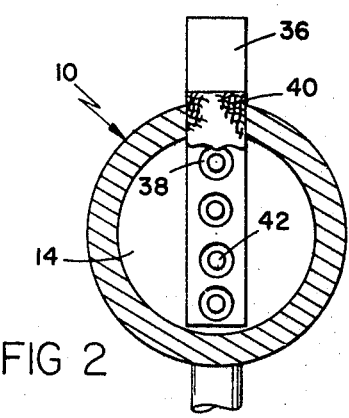
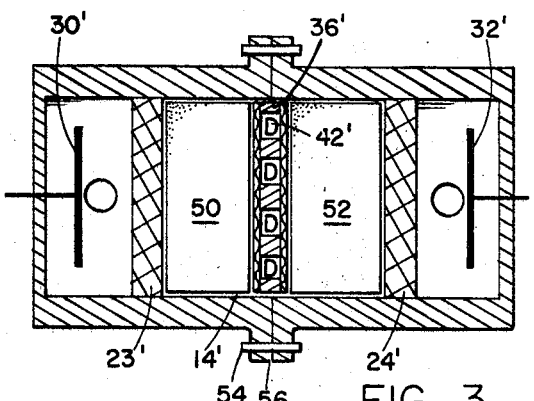
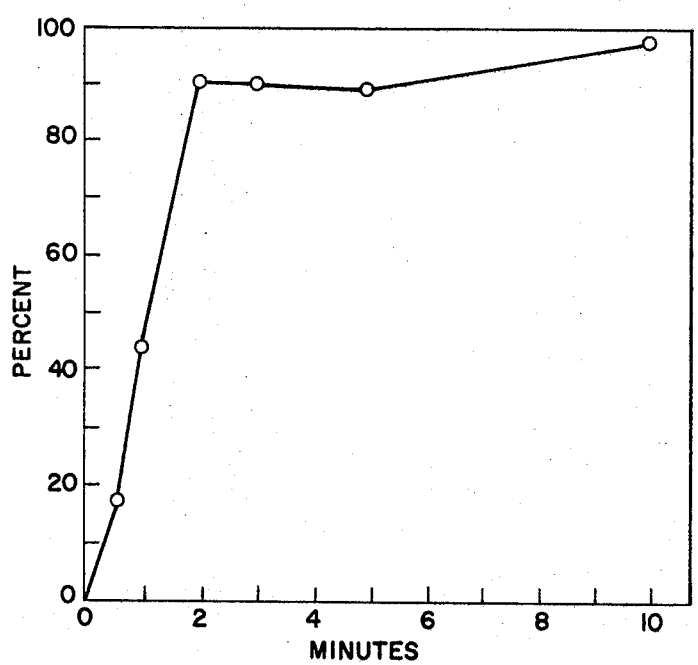

3,523,879
METHOD AND APPARATUS FOR
MATERIAL EXTRACTION
Julio M. Cortes, Shrewsbury, Mass., assignor to Worcester Foundation for Experimental Biology, Shrewsbury, Mass., a corporation of Massachusetts
Filed Aug. 25, 1966, Ser. No. 575,053
Int. Cl. B01d 13/02, 59/42
U.S. Cl. 204—180      16 Claims

ABSTRACT OF THE DISCLOSURE

A method of extracting a component from organic tissue includes the steps of positioning the organic tissue in an extraction chamber, and migrating cations into the extraction chamber by electrodialysis to extract a component from the tissue.

---

This invention relates to material extraction apparatus and methods and, more particularly, to methods and apparatus especially useful in the extraction of cellular components from organic tissue.

A object of the invention is to provide novel and improved methods and apparatus for extracting cellular components from organic tissue.

A more specific object of the invention is to provide methods and apparatus for the extraction of hormones from animal tissues.

A further object of the invention is to provide a novel and improved material treating apparatus utilizing elements that are selectively permeable to ions.

In accordance with the invention, there is provided an extraction chamber bounded on opposite sides by wall members that are selectively permeable to ions. Organic tissue is disposed in the extraction chamber surrounded by a neutral medium such as distilled water and ion source material is disposed on the outer sides of the chamber wall members. An electric potential of fixed polarity is impressed across the chamber and the resulting ion bombardment effects extraction of a cellular component from the tissue, which component is held in the neutral medium in the extraction chamber and not transported through the wall members. A particularly useful application of the invention is in the extraction of hormones from animal tissue. For example, corticosterone is extracted from adrenal glands through the invention. Similarly, cellular components may be extracted from plant tissue, for example, sugar may be extracted from beets with the methods and apparatus of the invention.

In a particular embodiment employed for the extraction of corticosterone from adrenal glands two permselective membranes, permeable to cations and not to anions, bound the extraction chamber. Distilled water is used in the extraction chamber and electrodes are immersed in a sodium acetate buffer solution which serves as a source of cations. The adrenal glands are positioned in the extraction chamber with a cut surface (from which the corticosterone is extracted) facing the anode. The electrodes are energized to establish a potential gradient having an initial value in excess of fifty volts per centimeter and preferably at least about one hundred volts per centimeter. The electric potential is preferably impressed for a period of at least one minute and the extraction is substantially complete within ten minutes. The current flow is preferably controlled to maintain a value less than six milliamperes/cm.$^2$ to avoid concentration polarization at the membrane interfaces, and possible protein denaturation, and also to avoid significant heating of the tissue material. Substantially complete extraction of corticosterone is obtained, in some cases the amount being obtained exceeding that indicated to be available from the glands by accepted analysis techniques.

Other objects, features and advantages of the invention will be seen as the following descriptions of particular embodiments thereof progress in conjunction with the drawing in which:

FIG. 1 is a diagram of extraction apparatus constructed in accordance with the invention;

FIG. 2 is a sectional view taken along the line 2—2 of FIG. 1 showing details of the extraction chamber and tissue holder;

FIG. 3 is a diagram of a modified form of extraction apparatus; and

FIG. 4 is a graph indicating the rate of extraction of corticosterone from adrenal glands with the apparatus shown in FIG. 1.

A seven compartment electrodialysis-type apparatus 10 constructed of acrylic resin used in the practice of the invention is diagrammatically shown in FIG. 1. The apparatus is cylindrical in shape with an internal diameter of 3.7 cm. and a wall thickness of 0.7 cm. Seven compartments 11–17, each having an inlet 18 and a drain 20, are separated from one another by ionic (permselective) membranes 21–26 which consist of ion exchange resins cast in sheet form on a synthetic cloth backing. The membranes 22, 23, 24 and 26 are of the cation permeable type, suitable membranes being those commercially designated Nepton 61–AZL–183 and their resins are sulphonated copolymers of vinyl compounds while the membranes 21 and 25 are of the anion permeable type, suitable membranes being those commercially designated Nepton 111–BZL–183 and their resins are copolymers of vinyl compounds containing quaternary ammonium groups and tertiary amine groups. The membranes are understood to have a pore size between ten and one hundred angstroms with an average pore size of twenty angstroms.

Disposed in each end compartment 11 and 17 is a platinum gauze electrodes 30, 32, which are connected to a direct current power supply 34 (Research Specialties Co. Model 1911). Membranes 21, 26, limiting the electrode compartments 11 and 17 have the function of preventing electrolysis products from reaching the other compartments. Membranes 22 and 25 are used as a safeguard to stop the movement of the material which might migrate into the chambers 13, 15, contiguous to the extracting chamber 14 and may be omitted. The middle chamber 14 is used as the extracting chamber and is limited by cation permeable membranes 23, 24. Compartment 14 is 12 mm. wide and has a larger inlet opening at the top to receive the tissue material which is held in a tissue holder 36. The holder 36 (as indicated in FIGS. 1 and 2) is an acrylic resin sheet 2 mm. thick, 1 cm. wide and 10 cm. in length. Four holes 38, 4 mm. in diameter are drilled at 2 mm. intervals at one end. Nylon cloth 40 is affixed on both sides of the sheet 36 for holding the tissue elements 42 in fixed position. The middle chamber 14 is provided with two platinum wires 44, 46, 1 cm. apart to measure the initial voltage by means of voltmeter 48.

Prior to an extraction run, the membranes 21–26 were stored at 10° C. and allowed to equilibrate in 0.025 M acetate buffer pH 4.5 at 4° C. for at least twenty-four hours before use. After assembly of the membranes in the apparatus, all the compartments except the middle one 14 are filled with a positive ion source, a 0.25 M sodium acetate buffer, of pH 4.5 being suitable. A non-ionic medium which does not damage the membranes (redistilled water being suitable) is used in compartment 14. (A 0.5 M sucrose solution is another satisfactory neutral medium for the extraction of corticosterone from the adrenal.)

In a specific extraction process, female Sprage-Dawley rats 200–250 gm. body weight were injected intraperitoneally with 200 U.S.P. units of Acthar-gel (Armour) and decapitated 15–30 minutes later. Adrenal glands of two rats were removed and cleaned. The right adrenal gland of one rat was crossed with the left adrenal gland of the other and used as a pair and vice versa. The adrenals were then bisected perpendicularly to the long axis. The adrenal halves of one crossed pair were used for extraction under an applied electrical field. The adrenal halves of the other crossed pair were used as controls, being immersed in the same aqueous solution and for the same time but without the application of the electrical current. The adrenal halves were next placed in the holes 38 of the plastic holder 36 and maintained in a fixed position by cloth 40. As soon as the glands were immersed in the middle compartment 14 an initial E.M.F. of 200 volts was applied as recorded by voltmeter 48 connected to the platinum wires of the middle chamber. In a typical sequence, the electrical current increases very rapidly from an initial density of 1–2 ma./cm.$^2$ reaching a limiting density of 5.5 ma./cm.$^2$ in 30–60 seconds. The limiting current density was kept below 5.5 ma./cm.$^2$ by manual control of the power supply 34. After five minutes, the current was turned off and the contents of the extraction compartment 14 drained into a flask.

The corticosterone content of the contents of extraction compartment 14 was determined by the fluorimetric technique described in F. Moncloa, F. G. Peron and R. I. Dorfman, Endocrinology, 65 (1959), 717.

In such an extraction run with the adrenal halves 42 oriented with the cut surface facing the anode 30, 95% of the adrenal corticosterone content of the glands was extracted and movement of material from the glands towards the anode is visible during the extraction process. Significantly less extraction occurs if the adrenal gland halves are oriented with their cut surfaces facing the cathode 32. The position of the holder 36 in the middle compartment 14 also has an effect on the amount of corticosterone extracted. If the holder is positioned close to membrane 23 the extraction was less efficient than if the holder positioned in the center of the chamber 14 or closer to membrane 24. Where a cation permeable membrane 23 limits the anode side of extraction chamber 14 but an anion permeable membrane 24 is used on the cathode side of the middle chamber, extraction was found to be not as complete as with two cation membranes but the preferred orientation of the adrenal halves 42 is the same, i.e., with the cut surface towards the anode.

The results of a series of experiments conducted with the apparatus shown in FIG. 1 for the extraction of corticosterone from adrenal glands are indicated in Table A. In this series of experiments both cation permeable membranes and anion permeable membranes were utilized and the orientation and position of the tissue elements was varied as indicated in the table.

The amount of corticosterone extracted as a function of time is indicated in FIG. 4. As there indicated, a maximum level of extraction effectively is reached in two minutes. No significant increase in extraction level was found with longer times of extraction.

Another form of apparatus is shown in FIG. 3 in which the extraction chamber 14' is bounded by two cation permeable membranes 23', 24'. Supplementary membranes 21, 22, 25 and 26 are omitted so that the electrodes 30', 32' are positioned immediately adjacent membranes 23', 24' as indicated. Disposed in extraction chamber 14' are two blocks 50, 52, of polyacrylamide gel that provide a fractionation of the components extracted from the tissue elements 42' supported in holder 36'.

TABLE A.—CORTICOSTERONE EXTRACTED FROM RAT ADRENAL GLANDS UNDER AN APPLIED E.M.F.

| Experiment Number | Middle Chamber Control[1] | Control Adrenal | Extracted Medium | Extracted Adrenal | Total[2] | Total, Minus Control | P | Percent Extracted[3] |
|---|---|---|---|---|---|---|---|---|
| | | | μg. of corticosterone ±S.E. | | | | | |
| 1 [0] | +C O C− | 4.38±0.30 | 0.51±0.15 | 4.26±0.30 | 4.76±0.25 | 0.39 | 0.3 | 11.6 |
| 2 | +C ᗡ C− | 4.78±0.32 | 1.56±0.20 | 3.91±0.40 | 5.47±0.42 | 0.69 | 0.2 | 32.6 |
| 3 | +C D C− | 4.33±0.17 | 4.11±0.14 | 0.45±0.14 | 4.56±0.25 | 0.23 | 0.4 | 94.9 |
| 4 | +C D C− | 5.37±0.30 | 3.38±0.24 | 2.25±0.14 | 5.63±0.25 | 0.26 | 0.5 | 62.9 |
| 5 | +C D C− | 5.20±0.34 | 4.71±0.20 | 0.43±0.13 | 5.24±0.31 | 0.04 | 0.9 | 90.6 |
| 6 | +A D A− | 4.71±0.25 | 0.58±0.06 | 4.51±0.28 | 5.09±0.33 | 0.38 | 0.4 | 12.3 |
| 7 | +A D C− | 4.89±0.28 | 0.08±0.01 | 4.84±0.22 | 4.92±0.21 | 0.04 | 0.9 | 1.6 |
| 8 | +A ᗡ C− | 5.58±0.30 | 0.10±0.01 | 5.56±0.19 | 5.66±0.19 | 0.08 | 0.08 | 1.8 |
| 9 | +C D A− | 4.88±0.10 | 3.43±0.14 | 3.55±0.09 | 6.98±0.17 | 2.10 | 0.001 | 70.3 |
| 10 | +C D A− | 6.02±0.18 | 3.83±0.57 | 3.67±0.56 | 7.50±0.12 | 1.49 | 0.001 | 63.6 |
| 11 | +C ᗡ A− | 5.02±0.36 | 1.45±0.19 | 4.98±0.44 | 6.43±0.32 | 1.41 | 0.02 | 28.9 |
| 12 | +C ᗡ A− | 5.98±0.51 | 1.20±0.09 | 5.4r±0.20 | 6.73±0.24 | 0.76 | 0.2 | 20.1 |
| 13[4] | +C D C− | +.46±0.24 | 4.89±0.18 | 0.18±0.12 | 5.07±0.21 | 0.61 | >0.1 | |
| 14[4] | +C D A− | 4.26±0.17 | 5.82±0.13 | 0.63±0.12 | 6.45±0.09 | 2.19 | <0.001 | |

[1] +A=Anion permeable membrane limiting the anodic side of chamber 14; +C=Cation permeable membrane limiting the anodic side of chamber 14; A−=Anion permeable membrane limiting the cathodic side of chamber 14; C−=Cation permeable membrane limiting the cathodic side of chamber 14. The symbols between the letters indicate the orientation and the position of the adrenal halves in chamber 14.—O=Intact adrenal gland (e.g. Exp. #1); ᗡ=Adrenal halves with cut surface facing the cathode (e.g. Exp. #2); D=Adrenal halves with the cut surface facing the anode (e.g. Exp. #3).
[2] Represents the sum of the corticosterone found in the medium of the middle chamber 14 plus the corticosterone remaining in the glands after being subjected to the electrical current (Extracted Adrenal).
[3] Percentage of corticosterone found in the medium of chamber 14 in relation to the controls.
[4] Adrenal halves were under an E.M.F. applied three times for a one minute period with a one minute interval between.

Note.—Each experiment includes five extraction runs.

Extraction is performed as above described and the extracted components move into the gel blocks 50, 52 under the influence of the electric field. In the gel blocks the mobility of the components is reduced and the different degrees of mobility of the extracted components produces a fractionation which facilitates the subsequent separation of the components. After extraction is complete, the housing 10' is opened by releasing the fasteners 54 on flanges 56 and the gel blocks are removed for further processing.

The following Tables I and II indicate the relative efficiency of extraction of corticosterone from adrenal glands with the apparatus shown in FIG. 1 employing different mediums in extraction chamber 14 and in the lateral chambers 11–13 and 15–17. In each of the examples listed in Tables I and II the length of two extraction run was five minutes:

TABLE I

| Acetate Buffer Lateral Compartments | n | μg. of Corticosterone per Adrenal Pair | | | Percent Extracted |
|---|---|---|---|---|---|
| | | Ext. Adrenal | Medium | Total | |
| 0.004 M | 10 | 3.66 | 0.85 | 4.50 | 17.1 |
| 0.006 M | 10 | 3.09 | 1.77 | 4.86 | 36.4 |
| 0.008 M | 10 | 1.84 | 3.20 | 5.04 | 63.9 |
| 0.020 M | 10 | 0.71 | 3.30 | 4.01 | 82.6 |
| 0.040 M | 10 | 0.54 | 3.05 | 3.59 | 84.9 |
| 1.000 M | 10 | 1.11 | 4.05 | 5.16 | 78.6 |

Note.—Middle chamber limited by cation permeable membranes and redistilled water used as medium. Initial E.M.F. 200 volts. Time of extraction 5 minutes.

TABLE II

| Acetate Buffer Middle Compartment | μg. of Corticosterone per Adrenal Pair | | | | |
|---|---|---|---|---|---|
| | n | Ext. Adrenal | Medium | Total | Percent extracted |
| None (¹) | 5 | 0.94 | 4.36 | 5.30 | 82.3 |
| 0.0004 M | 5 | 1.65 | 2.67 | 4.32 | 61.8 |
| 0.0040 M | 5 | 4.65 | 0.38 | 5.03 | 7.5 |
| 0.0400 M | 5 | 4.22 | 0.00 | 4.13 | 0.0 |

Note.—Lateral compartments, 0.04 M acetate buffer. Initial E.M.F., 200 volts. Time of extraction, 5 minutes.

TABLE III.—EXTRACTION OF VARIOUS CELLULAR COMPONENTS

| Tissue | Weight of sample, mg. | mg. of protein | | | Percent protein extract | Duration of extraction process, minutes |
|---|---|---|---|---|---|---|
| | | Homogenate | Medium | Total | | |
| Liver (rat) | 340 | 46.5 | 30.0 | 76.5 | 39.2 | 3 |
| Do | 269 | 34.8 | 24.2 | 59.0 | 41.0 | 5 |
| Kidney (rat) | 220 | 18.7 | 13.9 | 32.6 | 42.6 | 9 |
| Pituitary (Rabbit) | 72 | 5.5 | 3.9 | 9.4 | 41.4 | 6 |

| | | Mg. of sugar | | | Percent Sugar extract | |
|---|---|---|---|---|---|---|
| Red Beets (*) | 208 | 0.19 | 6.81 | 7.00 | 97.3 | 10 |

(*) Data represents the mean of 4 experiments.
Note.—0.05 M Acetate Buffer in the lateral chamber. Redistilled water in the middle chamber.

While particular embodiments of the invention have been shown and described, modifications thereof will be obvious to those skilled in the art. Therefore, it is not intended that the invention be limited to the disclosed embodiments or to details thereof and departures may be made therefrom within the spirit and scope of the invention as defined in the claims.

What is claimed is:

1. The method of extracting a component from organic tissue comprising the steps of
    positioning organic tissue between two selectively ion permeable membranes that form an extraction chamber, and applying an electric potential across said membranes between an anode and a cathode to extract a component from said tissue, at least one of said membranes being permeable to cations and impermeable to anions, said one membrane being positioned between said anode and said extraction chamber, a neutral medium in said extraction chamber and a source of positive ions on either side of said chamber.

2. The method as claimed in claim 1 wherein both of said membranes are cation permeable and impermeable to anions.

3. The method as claimed in claim 1 wherein an electric potential having an initial value in excess of fifty volts per centimeter is applied across said membranes.

4. The method as claimed in claim 1 wherein the component extraction process is substantially fully completed by application of said electric potential in less than ten minutes.

5. The method as claimed in claim 4 wherein said electric potential is applied across said membranes for at least one minute.

6. The method as claimed in claim 1 wherein said organic tissue is animal liver tissue.

7. The method as claimed in claim 1 wherein said organic tissue is animal kidney tissue.

8. The method as claimed in claim 1 wherein said organic tissue is animal pituitary gland tissue.

9. The method as claimed in claim 1 wherein said organic tissue is plant tissue.

10. The method of extracting a component from organic tissue comprising the steps of positioning organic tissue between two selectively ion permeable membranes with an exposed surface of said tissue disposed for impingement by cations, and applying an electric potential across said membranes between an anode and a cathode to extract a component from said tissue, at least one of said membranes being permeable to cations and impermeable to anions, said one membrane being positioned between said anode and said extraction chamber.

11. The method of extracting a component from organic tissue comprising the steps of positioning organic tissue between two selectively ion permeable membranes that are impermeable to the component to be extracted from said organic tissue, and applying an electric potential across said membranes to extract a component from said tissue.

12. The method of extracting a component from organic tissue comprising the steps of positioning organic tissue between two selectively ion permeable membranes that have a pore size smaller than the size of the component extracted and form an extraction chamber so that said extracted component is retained in said chamber; disposing fractionation material in said chamber and applying an electric potential across said membranes to cause cations to impinge on said tissue to extract a component from said tissue.

13. The method of extracting a component from organic tissue comprising the steps of
    positioning organic tissue between two selectively ion permeable membranes that form an extraction chamber, at least one of said membranes being permeable to cations and impermeable to anions, distilled water in said extraction chamber and an acetate buffer solution on either side of said chamber, and
    applying an electric potential across said membranes to cause cations to impinge on said tissue to extract a component from said tissue.

14. The method as claimed in claim 13 wherein the concentration of said buffer solution is at least 0.02 M.

15. The method of extracting a hormone component from animal tissue comprising the steps of
    positioning animal tissue between two selectively ion permeable membranes that form an extraction chamber, at least one of said membranes being permeable to cations and impermeable to anions, a neutral medium in said extraction chamber and a source of ions on either side of said chamber, and
    applying an electric potential across said membranes to cause cations to impinge on said tissue.

16. The method as claimed in claim 15 wherein said animal tissue is adrenal gland tissue.

References Cited

UNITED STATES PATENTS 1,972,561  9/1934  Heubaum _____ 204—1

FOREIGN PATENTS 21,448   8/1915   Great Britain.
285,417  11/1928  Great Britain.

OTHER REFERENCES

Barka, "Studies of Acid Phosphatase I, Electrophoretic Separation of Acid Phosphatases of Rat Liver on Polyacrylamide Gels," The Jrnl. of Histochem. and Cytochem., vol. 9, No. 5.

ROBERT K. MIHALEK, Primary Examiner

A. C. PRESCOTT, Assistant Examiner

U.S. Cl. X.R.

204—301